United States Patent [19]
Yokota et al.

[11] Patent Number: 5,717,542
[45] Date of Patent: Feb. 10, 1998

[54] DISK APPARATUS HAVING A SLIDE MEMBER SLIDING ALONG A SIDE WALL OF A FRAME

[75] Inventors: Kazuo Yokota, Tokyo; Hidetoshi Kabasawa, Saitama-ken, both of Japan

[73] Assignee: Teac Corporation, Tokyo, Japan

[21] Appl. No.: 871,592

[22] Filed: Jun. 9, 1997

Related U.S. Application Data

[63] Continuation of Ser. No. 491,082, Jun. 16, 1995, abandoned.

[30] Foreign Application Priority Data

Jun. 20, 1994 [JP] Japan ................................. 6-137617
Jun. 20, 1994 [JP] Japan ................................. 6-137618
Jun. 20, 1994 [JP] Japan ................................. 6-137619

[51] Int. Cl.⁶ ................................................. G11B 17/03
[52] U.S. Cl. ................................. 360/99.06; 360/99.02
[58] Field of Search ........................... 360/99.05, 99.06, 360/99.07, 99.03

[56] References Cited

U.S. PATENT DOCUMENTS

| | | | |
|---|---|---|---|
| 4,368,495 | 1/1983 | Hamanaka et al. | 360/99.06 |
| 4,833,553 | 5/1989 | Noda et al. | 360/99.06 |
| 5,060,101 | 10/1991 | Isomura | 360/106 |
| 5,198,933 | 3/1993 | Matsushita et al. | 360/99.06 |

FOREIGN PATENT DOCUMENTS

| | | |
|---|---|---|
| 56-13562 | 2/1981 | Japan . |
| 57-06462 | 1/1982 | Japan . |
| 63-23807 | 6/1995 | Japan . |

Primary Examiner—Stuart S. Levy
Assistant Examiner—William J. Klimowicz
Attorney, Agent, or Firm—Ladas & Parry

[57] ABSTRACT

There is provided a disk apparatus in which a slide member is movable in predetermined directions by engaging guiding holes provided on side surfaces of the slide member with engaging protrusions provided on respective side walls of a frame. The slide member and a latch lever are biased by a single spring. The holder is supported by a supporting member provided on the slide member. The holder has a hole which aligns with the supporting member to enable the holder to move downwardly. The holder is movable between a first position and a second position. The disk cartridge is ejected at the first position, and is loaded at the second position. The slide member holds the holder and is movable between a third position and a fourth position so that the holder is at the second position when the slide member is at the third position and the holder is at the first position when the slide member is at the fourth position. The frame has side walls extending in the insertion direction. The slide member is slidably supported by upper ends of the side walls. A guiding hole is provided on a side of the slide member. An engaging protrusion is provided on at least one of the side walls. The engaging protrusion extends in the insertion direction, and engages with the guiding hole so that the slide member is slidable only in an extending direction of the guiding hole.

4 Claims, 9 Drawing Sheets

DISK APPARATUS HAVING A SLIDE MEMBER SLIDING ALONG A SIDE WALL OF A FRAME

This is a continuation of application Ser. No. 08/491,082, filed on Jun. 16, 1995, now abandoned.

BACKGROUND OF THE INVENTION (1) Field of the Invention

The present invention generally relates to a disk apparatus, and more particularly to a disk apparatus having a holder into which a disk cartridge is inserted, the holder being moved to a disk loading position by a movement of a sliding member.

(2) Description of the Related Art

Recently, a magnetic disk apparatus, which performs a magnetic recording/reproducing operation by using a disk cartridge in which a flexible magnetic disk is accommodated, has become miniaturized and reduced in thickness. Such a miniaturization results in a decrease in space between parts constituting the magnetic disk apparatus, and thus a more precise machining has been required for each of the parts.

Generally, a conventional magnetic disk apparatus using a disk cartridge comprises a holder into which the disk cartridge is inserted, a slider which moves the holder, and a frame which movably supports the holder and the slider. The slider slides in an eject direction by an ejecting operation so as to move the holder from a disk loaded position to an eject position. The slider is slidably provided above the holder so as to reduce thickness of the magnetic disk apparatus. A cover member is provided above the slider to slidably support the slider. A shield cover is provided above the cover member.

In the above-mentioned conventional magnetic disk apparatus, since the cover member is provided between the slider and the shield cover, the number of parts is increased and the assembly process is complex. Additionally, guide pins must be screwed onto a bottom surface of the cover member. The guide pins support the slider by engaging with corresponding slots formed on the slider. Accordingly, there is a problem in that working efficiency is low for an assembling operation.

In the above-mentioned conventional magnetic disk apparatus, a movement of the slider to the disk loaded position can be achieved by rotation of a latch lever provided in the magnetic disk apparatus. That is, when the disk cartridge is not inserted, the slider is held at an eject position by the latch lever. When the disk cartridge is inserted into the holder and the latch lever is pressed and rotated by an edge of the disk cartridge, engagement of the slider by the latch lever is released. Since the slider is biased by a coil spring in a direction opposite to a direction in which the disk cartridge is ejected, the slider moves horizontally toward a disk loaded position due to the biasing force of the coil spring. Since the holder has pins which slide in respective slanting slots provided on side surfaces of the slider, the holder is moved down when the slider moves horizontally to the disk loaded position by being guided by the slanting slots.

When the holder is at the disk loaded position, an eject button which is provided on a front end of the slider protrudes from a front surface of the magnetic disk apparatus. The disk cartridge is ejected by pressing the eject button. When the eject button is pressed, the slider is moved horizontally and the holder is moved upwardly to the eject position. At this time, an engagement of the latch lever with the slider is released. Since the latch lever is biased in a rotational direction corresponding to the eject direction by a torsion spring, the disk cartridge in the holder is pressed and ejected from the holder. At this time, the latch lever engages with an engaging portion of the slider so as to rotate while pulling the slider. Accordingly, when the rotation of the latch lever is completed, the slider reaches the eject position.

As mentioned above, in the conventional magnetic disk apparatus, since the coil spring which biases the slider and the torsion spring which biases the latch lever is separately provided, the number of parts is increased. Additionally, when the slider is moved by an ejecting operation, an engaging portion of the slider slides on a cam portion of the latch so as to draw the slider to the eject position. That is, the latch lever draws the slider against a spring force generated by the coil spring biasing the slider. Accordingly, when the latch lever rotates in the eject direction, a force exerted on the cam portion of the latch lever is large, resulting in slowing the rotational movement of the latch lever due to a friction force between the engaging portion and the cam portion.

Additionally, as mentioned above, the engaging portion of the slider is strongly pressed onto the cam portion of the latch lever. Accordingly, a surface of the cam portion may be worn after an extended period of use. When a friction force is generated between the cam portion and the engaging portion due to the wearing of the cam portion, the rotational movement of the latch lever is stopped before it reaches an end position. Accordingly, there is a possibility that a reliable eject operation for the disk cartridge is not achieved.

Additionally, in the conventional magnetic disk apparatus, a head arm provided with a magnetic head has a contact portion which contacts to the holder. The contact portion is pressed against the holder by means of a torsion spring. Accordingly, when the holder moves to the disk loaded position or the eject position, the head arm rotates to have the magnetic head contact the magnetic disk in the disk cartridge or to separate the magnetic head from the magnetic disk, respectively.

As mentioned above, the slider is held at the disk loaded position until the disk cartridge is inserted into the holder. When the disk cartridge is inserted into the holder and a front end of the disk cartridge is pressed against the latch lever, the latch lever rotates in a direction to release the engagement of the slider.

Accordingly, the slider moves to the eject position in which the eject button protrudes from the front surface of the magnetic disk apparatus when the disk cartridge is inserted into the holder. When the slider moves to the eject position, the holder moves downwardly to the disk loaded position.

In the above-mentioned magnetic disk apparatus, the holder is merely supported by the pins protruding from the sides of the holder. The pins engages with the slanting slots formed on the slider. Additionally, the strength of a top plate of the holder is decreased due to a decrease in thickness of the magnetic disk apparatus. Accordingly, in a case in which the magnetic disk apparatus is incorporated into a portable apparatus such as a notebook type personal computer, the top plate of the holder may be elastically bent due to a shock applied while the portable apparatus is carried. In such a case, the head arm bearing against the top plate of the holder may rotate. This causes an upper magnetic head provided on the head arm collide with a lower magnetic head, resulting in damage of the upper and lower magnetic heads.

Additionally, while the holder is at the eject position, the top plate of the holder is always pressed downwardly by the contacting portion of the head arm. Thus, the top plate may be permanently bent downwardly after an extended period of use. In such a case, height of the disk cartridge inserted in the holder is decreased, and thereby the front end of the disk cartridge may contact to and damage the lower magnetic head.

SUMMARY OF THE INVENTION

It is a general object of the present invention to provide an improved and useful disk apparatus in which the above-mentioned disadvantages are eliminated.

A more specific object of the present invention is to provide a disk apparatus in which a slide member is movable in predetermined directions by engaging guiding holes provided on side surfaces of the slider with engaging protrusions provided on respective side walls of a frame.

Another object of the present invention is to provide a disk apparatus in which a slide member and a latch lever can be biased by a single spring.

Another object of the present invention is to provide a disk apparatus in which a holder is supported by a supporting member provided on a slide member while the holder is at an eject position, the holder having an opening which aligns with the supporting member to enable the holder to move downwardly to a disk loaded position.

In order to achieve the above-mentioned objects, there is provided according to one aspect of the present invention a disk apparatus for a disk cartridge, comprising:

a holder movable between a first position and a second position in a direction perpendicular to an insertion direction of the disk cartridge, the disk cartridge being ejected at the first position and being inserted at the second position;

a slide member holding the holder and movable between a third position and a fourth position in the insertion direction so that the holder is positioned at the second position when the slide member is positioned at the third position and the holder is positioned at the first position when the slide member is positioned at the fourth position;

a frame having side walls extending in the insertion direction, the slide member being slidably supported by upper ends of the side walls;

a guiding hole provided on a side of the slide member and extending in the insertion direction; and an engaging protrusion provided on at least one of the side walls of the frame and extending in the insertion direction, the engaging protrusion engaging with the guiding hole so that the slide member is slidable in the insertion direction.

According to the above-mentioned invention, an assembling operation for a conventional cover plate which supports the slide member is not needed, and the slide member can be assembled without screws. Thus, the number of parts is reduced and higher efficiency in the assembling process can be achieved.

Additionally, there is provided according to another aspect of the present invention a disk apparatus for a disk cartridge, comprising:

a holder movable between a first position and a second position in a direction perpendicular to an insertion direction of the disk cartridge, the disk cartridge being ejected at the first position and being inserted at the second position;

a slide member holding the holder and movable between a third position and a fourth position in the insertion direction so that the holder is positioned at the second position when the slide member is positioned at the third position and the holder is positioned at the first position when the slide member is positioned at the fourth position;

a latch lever, rotatably supported on the holder, and engaging with the slide member so as to hold the slide member at the fourth position, the latch lever being rotated by a pressing force of the disk cartridge being inserted into the holder to release the slide member; and a spring having a first end engaged with the slide member and a second end engaged with the latch lever, the spring biasing the slide member so that the slide member is moved from the fourth position to the third position when the slide member is released from the latch lever.

According to the invention, the number of springs is reduced as compared to the conventional disk apparatus in which a spring is separately provided to the slide member and the latch lever. Thus, a higher efficiency in the assembly process can be achieved. Additionally, when the slide member is at the eject position, a spring force generated by the spring is minimized and a friction force generated between the latch lever and the slide member is reduced, resulting in a smooth rotation of the latch lever. Additionally, when the slide member is moved by an eject operation, since the latch lever rotates from an eject position to a disk loading position, the engagement of the latch lever is released when a spring force generated by the spring is at a maximum. Accordingly, the disk cartridge can be reliably ejected by a powerful rotation of the latch lever caused by the spring.

There is provided according to another aspect of the present invention a disk apparatus for a disk cartridge, comprising:

a holder movable between a first position and a second position in a direction perpendicular to an insertion direction of the disk cartridge, the disk cartridge being ejected at the first position and being inserted at the second position;

a slide member holding the holder and movable between a third position and a fourth position in the insertion direction so that the holder is positioned at the second position when the slide member is positioned at the third position and the holder is positioned at the first position when the slide member is positioned at the fourth position;

a frame slidably supporting the slide member;

a holder supporting member provided on the slide member and positioned under the holder so as to prevent a downward movement of the holder when the slide member is positioned at the fourth position; and a hole provided in the holder and aligned with the holder supporting member when the slide member is positioned at the third position so that the holder supporting member extends into the hole.

According to the invention, when the disk cartridge is not inserted into the holder, the holder is held at the predetermined height by the holder supporting member and bending of the holder can be prevented. Further, deformation of the holder due to shocks applied to the disk apparatus can be prevented.

Other objects, features and advantages of the present invention Will become more apparent from the following detailed description when read in conjunction with the accompanying drawings.

DETAILED DESCRIPTION OF THE PREFERRED EMBODIMENT

Figure 1:
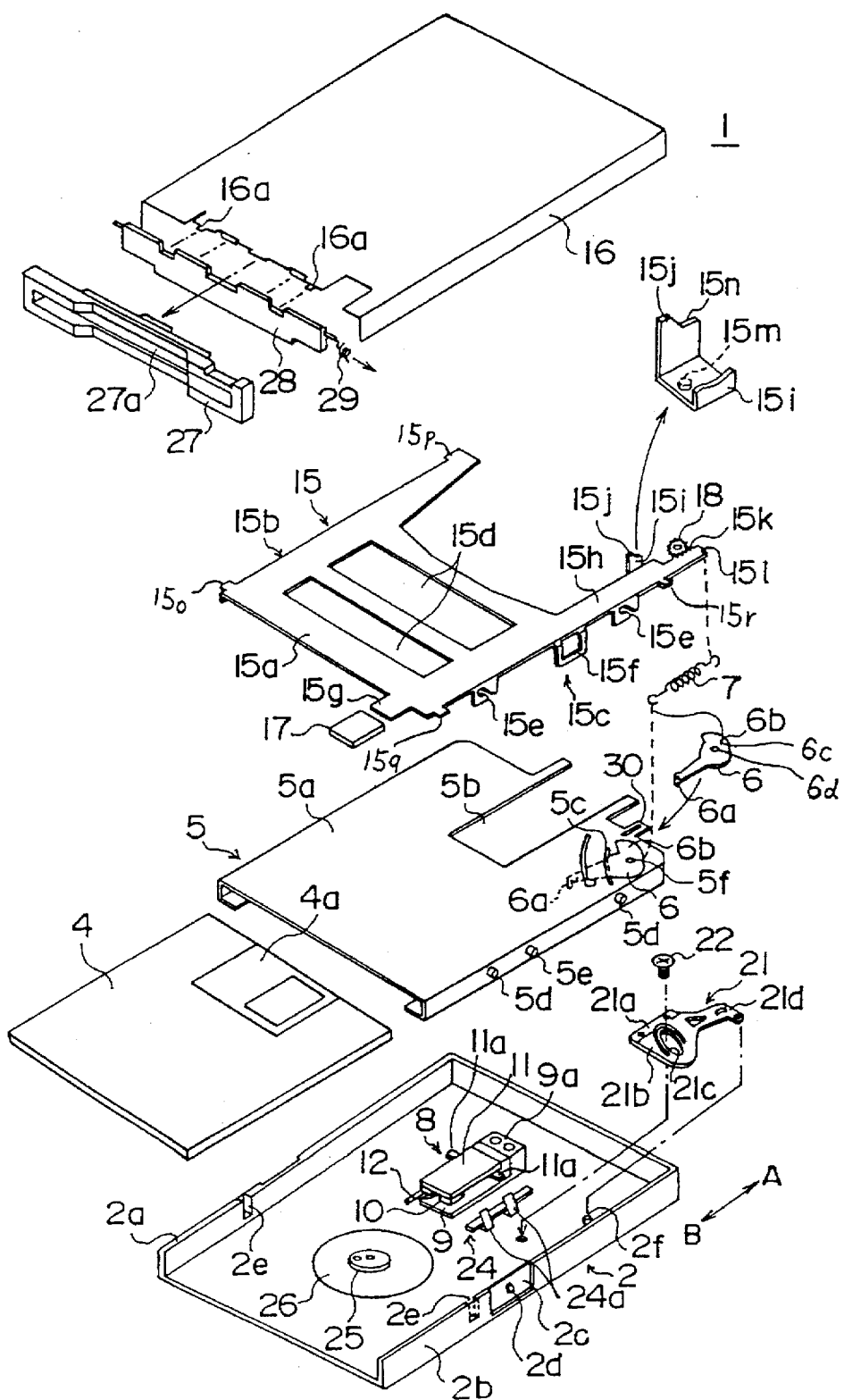
FIG. 1 is an exploded perspective view of an embodiment of a magnetic disk apparatus according to the present invention.
Figure 2:
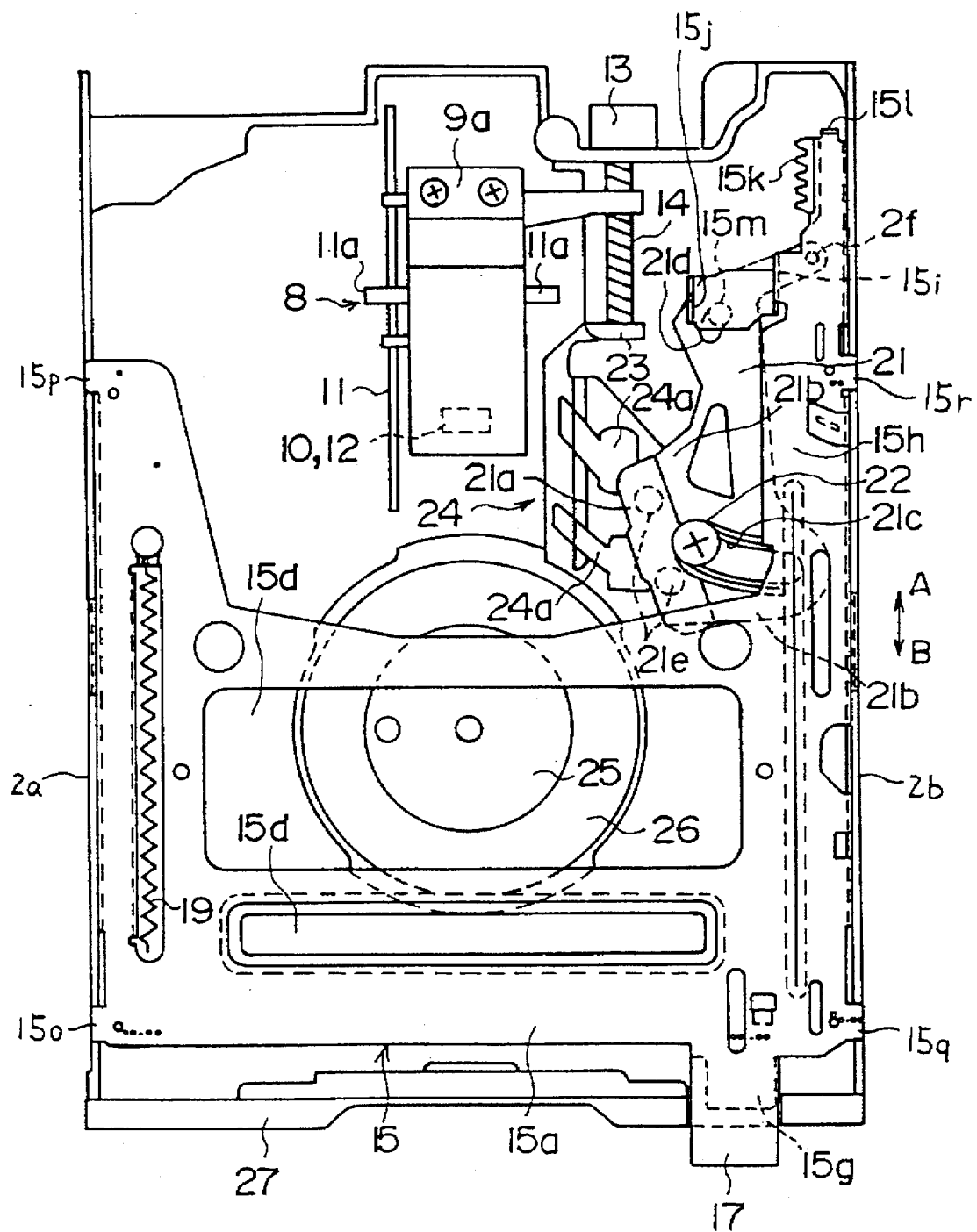
FIG. 2 is a plan view of the magnetic disk apparatus shown in FIG. 1.
Figure 3:
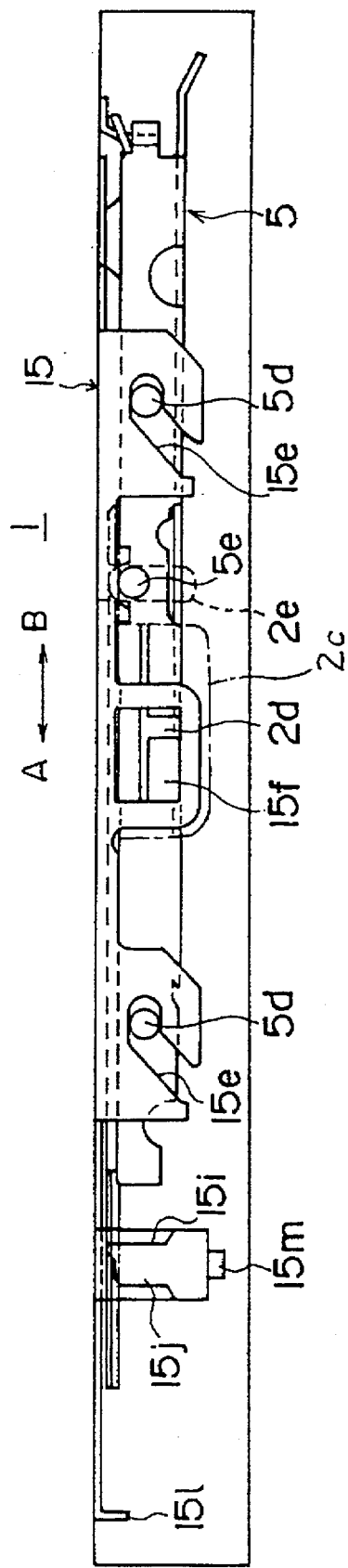
FIG. 3 is a side view of a holder and a slider shown in FIG. 1 which are assembled together.
Figure 4:
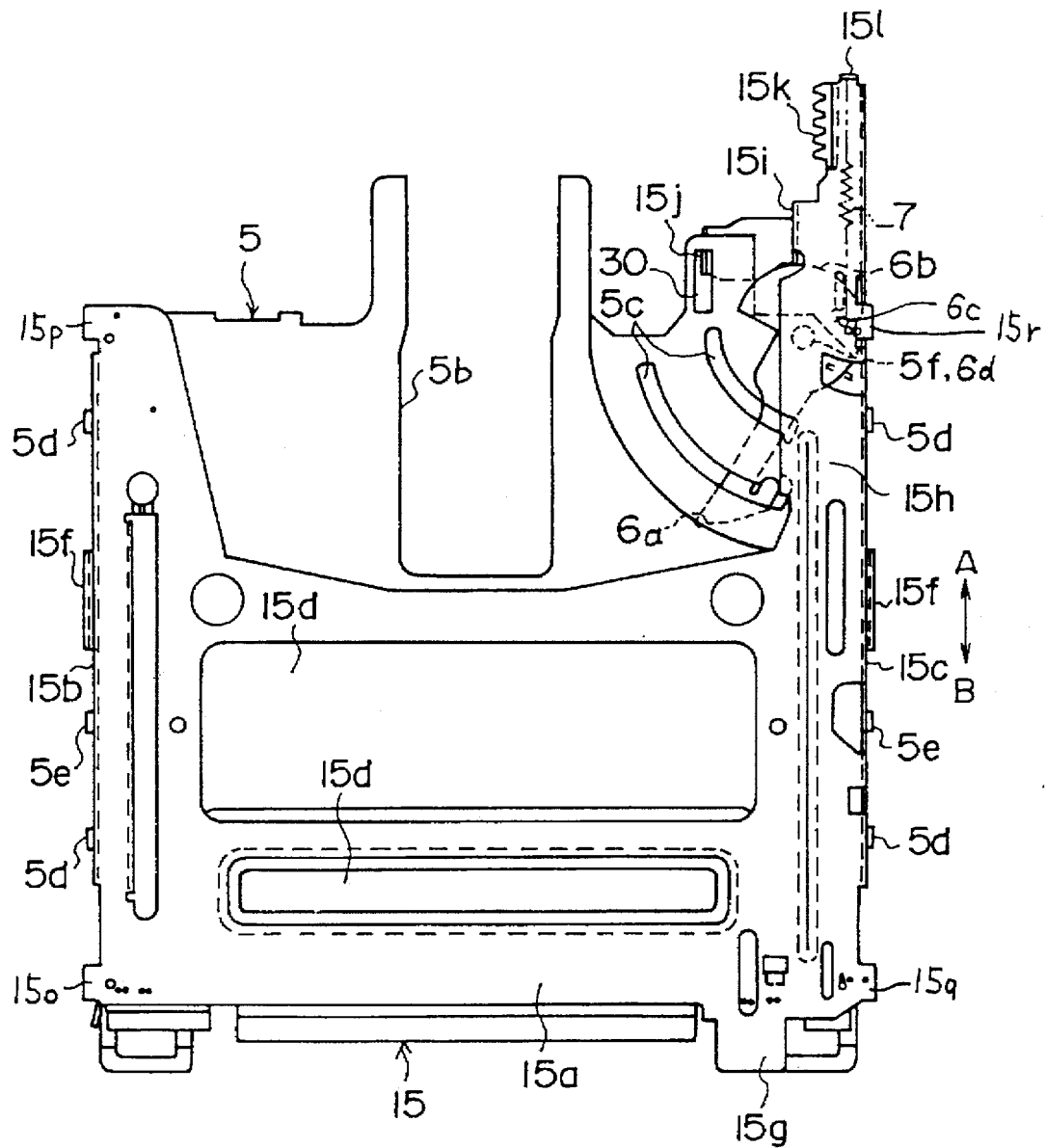
FIG. 4 is a plan view showing a positional relationship between the holder and the slider shown in FIG. 1 before a disk cartridge is inserted into the holder.

A description will now be given, with reference to FIGS. 1 to 4, of an embodiment of a magnetic apparatus 1 according to the present invention. FIG. 1 is an exploded perspective view of the embodiment of the magnetic disk apparatus 1 according to the present invention. FIG. 2 is a plan view of the magnetic disk apparatus 1 shown in FIG. 1. FIG. 3 is a side view of a holder and a slider shown in FIG. 1 which are assembled together. FIG. 4 is a plan view showing a positional relationship between the holder and the slider shown in FIG. 1 before a disk cartridge is inserted into the holder.

As shown in FIG. 1, the disk apparatus 1 comprises a frame 2, a holder 5, a slider 15, and a shield cover 16. The holder 5, the slider 15 and the shield cover 16 are assembled on the frame 2. A disk cartridge 4 having a magnetic disk therein is insertable into the holder 5.

The holder 5 is moved upwardly or downwardly so as to move the disk cartridge 4 to a disk loaded position or an eject position. A top plate 5a of the holder 5 is provided with an opening 5b in which a magnetic head unit 8 is received. A latch lever 6 is rotatably supported on the top plate 5a so that the shutter 4a of the disk cartridge 4 is opened upon insertion of the disk cartridge. The latch lever 6 also hooks the slider 15 so as to maintain the slider 15 at a disk loaded position.

An engaging pin 6a protrudes from an end of the latch lever 6 so as to slide the shutter 4a in an open direction by contacting a leading edge of the disk cartridge 4. The latch lever also serves as an eject member which presses the disk cartridge 4 in an eject direction (indicated by an arrow B in FIG. 1 and hereinafter referred to as "B direction"). The end of the latch lever 6 having the engaging pin 6a is inserted into the holder 5 via an arc-shaped slot 5c.

The latch lever 6 is supported by a shaft 5f provided on the top plate 5a of the holder 5. The latch lever has an arc-shaped cam portion 6b the center of which corresponds to the shaft 5f. A hole or opening 6c is provided for a spring at a position on the cam 6b side and apart from a shaft hole 6d into which the shaft 5f is received. The cam 6b is engaged with the slider 15. The cam 6b rotates to release the slider 15 when the disk cartridge 4 is inserted into the holder 5.

The latch lever 6 is biased by a coil spring 7. One end of the coil spring 7 is hooked on or otherwise connected with the hole or opening 6c, and the other end of the coil spring 7 is hooked or otherwise connected with a hooking portion 15i of the slider 15. Accordingly, the latch lever 6 is biased counterclockwise by a tension force of the coil spring 7. At the same time the slider 15 is biased in the B direction by the tension force generated by the coil spring 7.

As mentioned above, since the coil spring 7 is provided to bias both the latch lever 6 and the slider 15, the number of parts of the apparatus is reduced as compared to the conventional construction in which separate torsion springs are provided for the latch lever and the slider. When the slider 15 is at a position shown in FIG. 4, the spring force of the coil spring 7 is at its weakest. Accordingly, when the latch lever 6 is rotated by an insertion of the disk cartridge 4, the friction force generated between the cam portion 6b and the engaging portion 15i is small. Thus, the latch lever 6 can be smoothly rotated.

When the slider 15 is moved in a direction (hereinafter referred to as "A direction") indicated by an arrow A in FIG. 1, the latch lever 6 is located at a position shown in FIG. 6 and the coil spring 7 is in its most stretched state. Accordingly, the lever 6 strongly rotates to ensure ejection of the disk cartridge 4. The A direction corresponds to the insertion direction of the disk cartridge 4 into the holder 5.

The magnetic head unit 8 has a carriage 9 and an arm 11 rotatably supported on a base end 9a of the carriage 9. The carriage 9 moves in the A or B direction on the frame 2 in accordance with a rotation of a lead screw 14 (shown in FIG. 5) and, thus, magnetic heads 10 and 12 are moved in a tracking direction of the magnetic disk.

The arm 11 is biased downwardly by a pressing force exerted by a torsion spring (not shown in the figures) provided to the base end 9a of the carriage 9. Additionally, a contact portion 11a protrudes on a side of the arm 11. The contact portion 11a contacts the top plate 5a of the holder 5. That is, the arm 11 is pressed upwardly before the disk cartridge is inserted because the holder 5 is at a lifted position and, thus, the upper magnetic head 12 is separated from the lower magnetic head 10.

The slider 15 is provided between the top plate 5a of the holder 5 and the shield cover 16. The slider 15 has a top plate portion 15a facing the top plate 5a of the holder 5 and side portions 15b and 15c which are bent downwardly. It should be noted that the side portion 15b is not seen in FIG. 1 as it is hidden by the top plate 15a. The top plate 15a is provided with openings 15d for reducing weight.

Slanting grooves 15e and a guiding hole 15f are provided in each of the side portions 15b and 15c. Protruding pins 5d protruding from both sides of the holder 5 are received in the respective slanting grooves 15e. The guiding hole 15f guides the holder 15 to slide in the A or B direction. The guiding hole 15f is formed as a rectangular shape extending in the A-B direction. The guiding hole engages with a protrusion provided on a recess 2c of each of the side walls 2a and 2b of the frame 2. It should be noted that the portions having the guiding hole 15f are extended slightly outwardly from the portions having the slanting groove 15e. Accordingly, the portions having the guiding hole 15f can be positioned outside the frame 2, and the portions having the slanting groove 15e can be positioned inside the frame 2.

Contacting portions 15o to 15r protruded from both sides of the top plate 15a of the slider 15 to contact an upper end of each of the side walls 2a and 2b of the frame 2. A downward movement of the slider 15 is limited as the contacting portions 15o to 15r contact the upper end of each of the side walls 2a and 2b. Accordingly, the slider 15 can be moved in the A and B directions.

As mentioned above, since a supporting member slidably supporting the slider 15 is not needed in the present embodiment, the total thickness of the apparatus 1 can be reduced and the number of parts is also reduced. Additionally, since the assembly operation for the slider 15 is very simple and since the slider 15 can be assembled on the side walls 2a and 2b of the frame 2 without screws, efficiency of the assembling process is increased.

Further, since each of the engaging protrusions 2d has a slanting surface on an upper portion thereof, the guiding holes 15f of the slider 15 can be engaged with the respective engaging protrusions 2d by simply pressing the slider 15 downwardly. Since the portions having the guiding holes 15f slide in the recesses 2c provided on the outer surface of the side walls 2a and 2b, the portion having the guiding holes 15f do not protrude from the outer surface of the side walls 2a and 2b.

An engaging portion 5e protruding from each of the sides of the holder 5 is received in a groove 2e provided in each of the side walls 2a and 2b of the frame 2. Accordingly, the holder 5 is moved, when the slider 15 is moved in the A or B direction, in directions perpendicular to the A or B directions since movement of the engaging portion 5e is guided by the groove 2e.

An attaching portion 15g for an eject button 17 extends from a front end of the top plate 15a of the slider 15. An arm portion 15h which extends in the A direction has a hooking portion 15i, a holder supporting portion 15j and a rack 15k. The hooking portion 15i hooks the slider 15. The holder supporting portion 15j is provided on an end of the hooking portion 15i. A damper 18 engages with the rack 15k so as to reduce the sliding speed of the slider 15.

Figure 9:
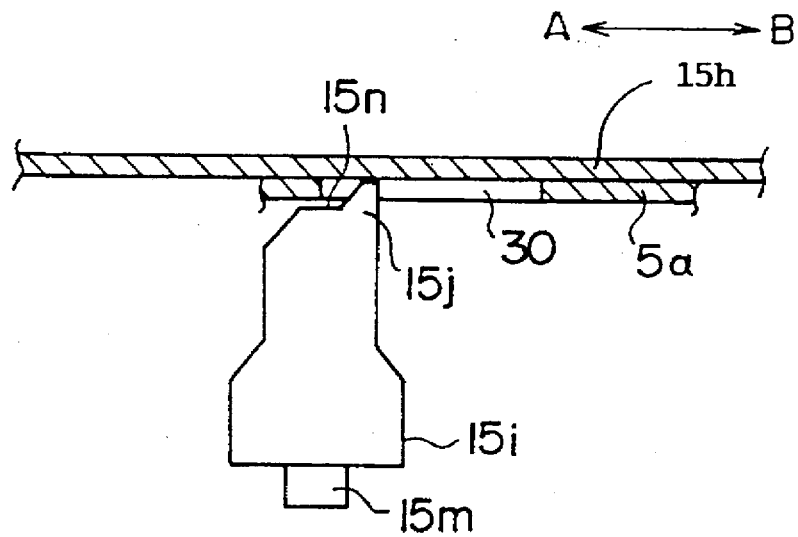
FIG. 9 is a side view of a holder supporting member when the holder is at an eject position.

The holder supporting portion 15j of the slider 15 extends upwardly at a position adjacent to the magnetic head unit 8. As shown in FIG. 9, a top end of the holder supporting portion 15j projects into a longitudinal hole 30 provided in the top plate 5a of the holder 5. A stage 15n of the holder supporting portion 15j is positioned under the top plate 5a so as to maintain a height of the top plate 5a. Accordingly, before the disk cartridge 4 is inserted into the holder 5, the top plate 5a of the holder 5 is supported by the stage 15n of the holder supporting portion 15j at the position adjacent to the magnetic head unit 8 so that a downward movement of the top plate 5a is limited. The holder supporting portion 15j has an engaging pin 15m extending close to the a bottom surface of the frame 2. That is, the engaging pin 15m is positioned between the holder supporting portion 15j and the bottom surface of the frame 2 and, thus, the limitation of the downward displacement of the top plate 5a of the holder 5 is ensured. Accordingly, when the disk cartridge 4 is not inserted in the holder 5, the top plate 5a of the holder 5 is supported by the stage 15n so that the downward movement of the top plate 5a due to deformation caused by an external force is prevented. Therefore, the arm 11 of the magnetic head unit 8, which contacts the top plate 5a of the holder 5, does not rotate due to an external force exerted on the top plate 5a and, thus, the upper magnetic head 12 does not collide with the lower magnetic head 10.

The holder 5 moves down to the disk cartridge loaded position when the slider 15 is moved in the B direction and thus the longitudinal hole 30 provided in the top plate 5a corresponds to the stage 15n of the holder supporting portion 15j.

When the holder 5 is at the eject position, the contact portion 11a of the arm 11 contacts and presses the top plate 5a of the holder 5. However, due to the provision of the holder supporting portion 15j, the top plate 5a is prevented from being bent downwardly even after an extended period of use. As a result, the height of the disk cartridge 4, when the disk cartridge 4 is moved to the disk loaded position, is maintained at an appropriate level. This condition prevents a leading edge of the disk cartridge 4 from colliding with the lower magnetic head 10.

The slider 15 is pressed by a compression spring 19 (refer to FIG. 2) in the B direction. One end of the compression spring 19 engages with the slider 15 and the other end engages with an engaging portion (not shown in the figures) protruding from the top plate 5a of the holder 5. The slider 15 is displaced in the B direction when the disk cartridge 4 is loaded by pressing forces of the compression spring 19 and the spring 7. The slider 15 moves in the A direction when the eject button 17 is pressed.

A contact preventing member 21 is provided to maintain a height of the disk cartridge 4 so that the leading edge of the disk cartridge 4 does not contact the lower magnetic head 10 when the disk cartridge moves to the disk loaded position. The contact preventing member 21 is rotatably supported by a pin 2f provided on the frame 2 as shown in FIG. 2.

The contact preventing member 21 comprises a guiding portion 21a, an arm 21b, a guiding hole 21c and a fitting hole 21d. The guiding portion 21a overrides on a protrusion 24 provided on the bottom surface of the frame 2 adjacent to the side of the magnetic head unit 8 so as to guide the disk cartridge 4 to a height at which the leading edge of the disk cartridge 4 does not contact the lower magnetic head 10. The arm 21b supports the guiding portion 21a so that the guiding portion 21a can move upwardly. The guiding hole 21c, which has an arc-like shape, receives a screw 22 therethrough which is secured to the frame 2 so as to guide a rotating operation of the contact preventing member 21. The fitting hole 21d, which has an arc-like shape, receives the engaging pin 15m protruding downwardly from the engaging portion 15i of the slider 15.

The contact preventing member 21 is integrally formed from a plastic material. A surface of the guiding portion 21a has a low coefficient of friction so that the guiding portion easily slides on the protrusion 24. The arm 21b is flexible so that it can be elastically deformed. The contact preventing member 21 rotates about the pin 2f as the slider 15 moves in the A or B direction because the engaging pin 15m of the slider 15 is engaged with the fitting hole 21d.

In the foregoing, no connecting member is provided between the contact preventing member 21 and the slider 15 and, thus, a wide space can be provided around the contact preventing member 21. Accordingly, area of movement of the contact preventing member 21 is not limited. This permits greater freedom of design. Additionally, since the number of parts is reduced compared to a conventional apparatus, the number of assembling processes is also reduced. Further, a stroke of the magnetic head unit 8 can be extended because a bearing 23, which supports an end of the lead screw 14 of the stepping motor 13 (refer to FIG. 2), can be moved in the B direction. Accordingly, more room can be provided around the magnetic heads 10 and 12.

The guiding portion 21a has a pair of hemispherical protrusions 21e on the bottom thereof. The protrusions 21e slide on a pair of slopes 24a, respectively, provided on the protrusion 24 on the frame 2. The protrusions 21e slide on the respective slopes 24 as the guiding portion 21a moves to the protrusion 24.

Accordingly, when the slider moves in the A direction, the guiding portion 21a is moved upwardly to a position at which the guiding portion 21 supports the disk cartridge 4. Since the pair of protrusions 21e slides on the pair of slopes 24a, the guiding portion 21a does not tilt and, thus, the disk cartridge 4 can be moved in a stable horizontal manner.

Additionally, since movement of the portion having the guiding hole 21c is limited by the screw 22, the arm 21b is elastically bent when the guiding portion moves upwardly. Accordingly, the guiding portion 21a is always pressed downwardly toward the protrusion 24 and, thus, the protrusions 21e are not separated from the slopes 24 when the protrusions 24e slides on the slopes 24a. Therefore, the guiding portion 21a does not block the insertion path of the disk cartridge 4.

A turntable 25 is provided for the magnetic disk, accommodated in the disk cartridge 4, when the disk is loaded in the apparatus 1. The turntable 25 is rotated at a constant speed by a motor 26.

A front bezel 27 is attached to front ends of the frame 2 and the shield cover 16. An opening 27a is provided in the front bezel so that the disk cartridge 4 is inserted via the opening 27a. A door 28 is rotatably attached on an inner side of the opening 27a for closing the opening.

The door 28 is pressed against the front bezel 27 by a torsion spring 29 so as to close the opening 27a. The door 28 is rotated to access the opening 27a by an insertion force applied by the disk cartridge 4. Protrusions 16a are provided on a front end of the shield cover so that deformation of the door 28 due to insertion of the disk cartridge 4 is prevented.

A description will now be given of an operation of the magnetic disk apparatus 1.

Figure 5:
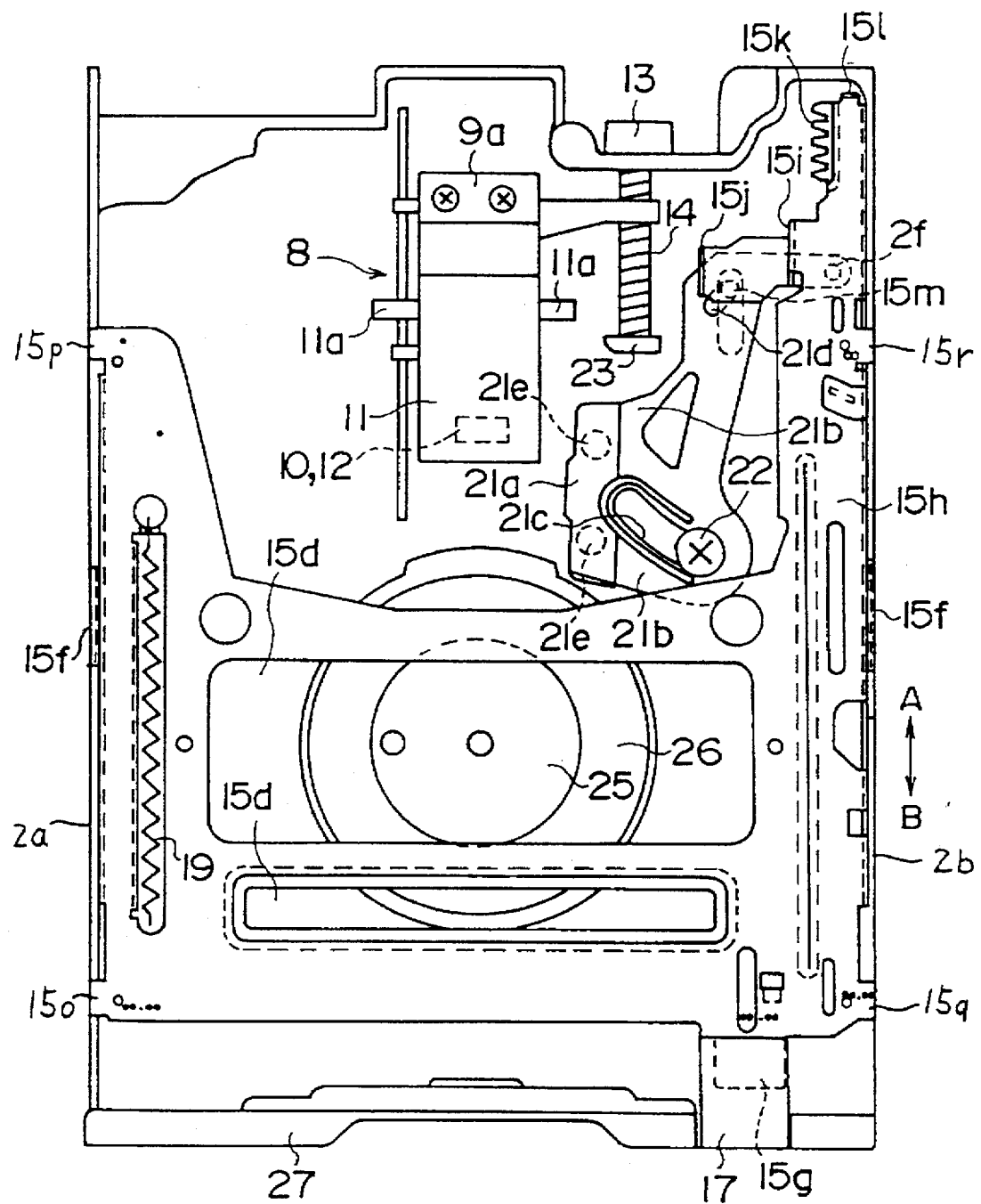
FIG. 5 is a plan view showing inside of the magnetic disk apparatus shown in FIG. 1 before a disk cartridge is inserted, in a state where a shield cover and the holder are removed.

The magnetic disk apparatus 1 before the disk cartridge 4, that is the slider 15 is moved in the A direction, is loaded is shown in FIGS. 3 to 5. In this state, the arm 11 having the upper magnetic head 12 has been positioned upwardly to the eject position. The latch lever 6 has been rotated to the eject position as shown in FIG. 4. The contact preventing member 21 is in the contact preventing position as shown in FIG. 5.

Figure 8:
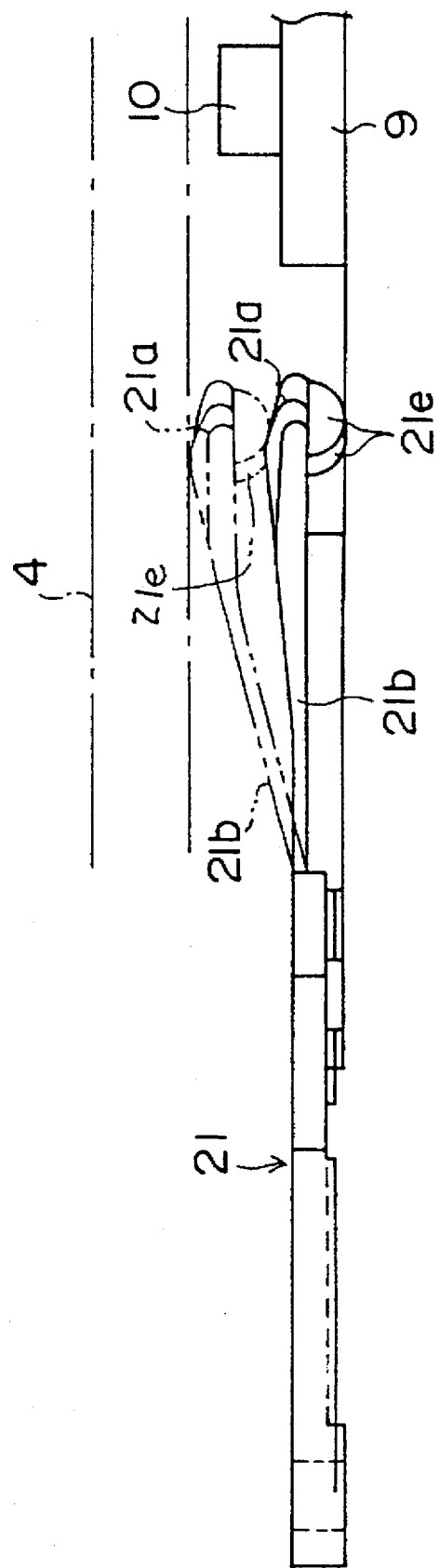
FIG. 8 is a side view of a contact preventing member shown in FIG. 1.

When the disk cartridge 4 is inserted into the holder 5 via the opening 27a of the front bezel 27, the leading edge of the disk cartridge 4 moves in the A direction and thus contacts the contact pin 6a of the latch lever 6. Since the holder 5 is supported by the holder supporting portion 15i, the disk cartridge 4 does not contact the lower magnetic head 10. Additionally, since the guiding portion 21a of the contact preventing member 21 slide over the slopes 24a of the protrusion 24, the leading edge of the disk cartridge 4 slides on the guiding portion 21a of the contact preventing member 21 as indicated by a chain line in FIG. 8. Accordingly, The disk cartridge 4 is guided to a height position at which the leading edge of the disk cartridge 4 does not contact to the lower magnetic head 10.

Figure 6:
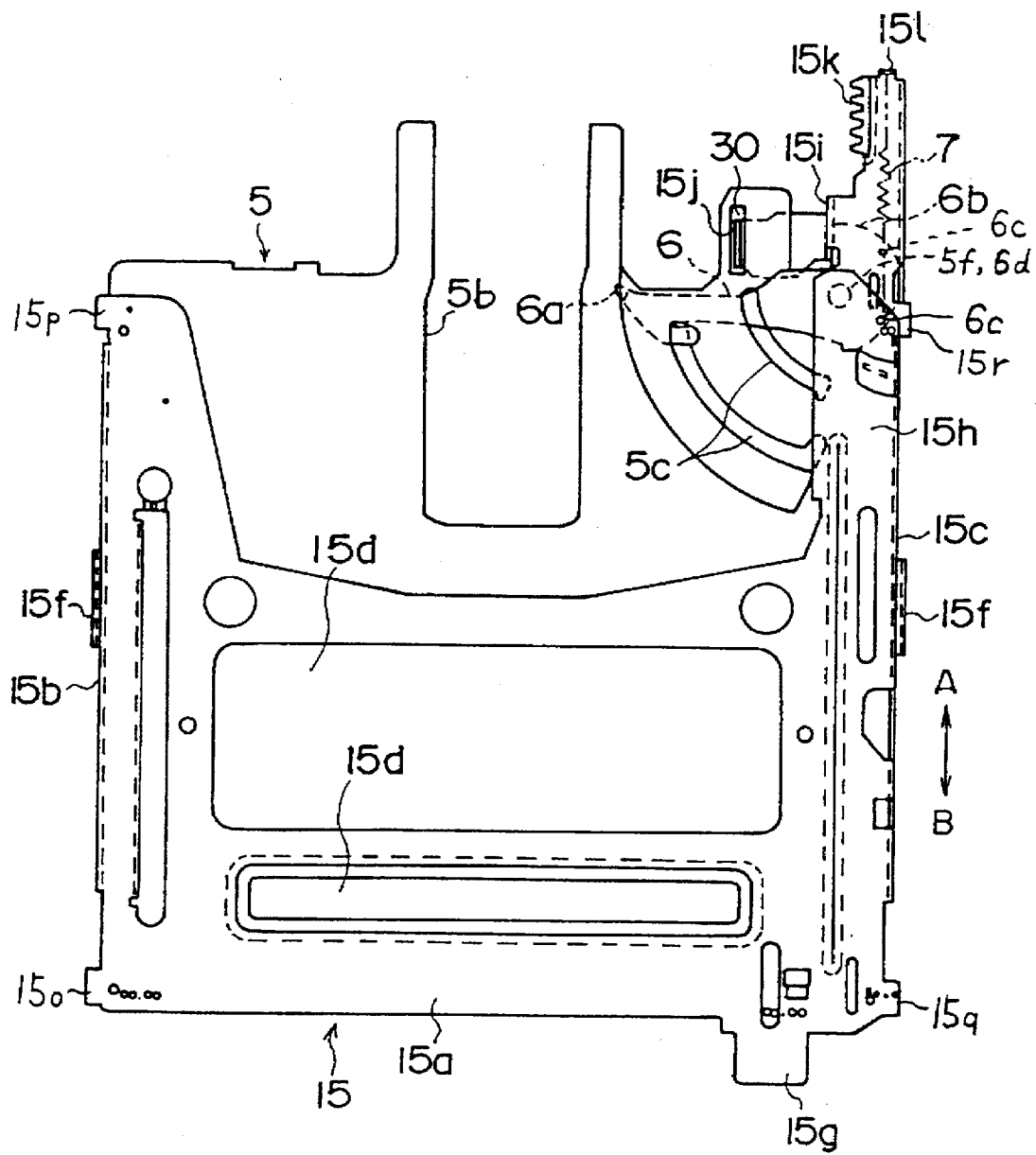
FIG. 6 is a plan view showing a positional relationship between the holder and the slider shown in FIG. 1 after the disk cartridge is inserted into the holder.

When the disk cartridge 4 is further moved in the A direction, the latch lever 6 is rotated clockwise as shown in FIG. 6 and, thus, the shutter 4a of the disk cartridge 4 is opened. In this manner, since the cam portion 6b of the latch lever 6 is separated from the engaging portion 15i of the slider 15, the connection or hooking of the slider by the latch lever 6 is released. Thereby, the slider is moved in the B direction by the springs 7 and 19. The guide hole 15f of the slider 15 is movably engaged with the engaging protrusion 2d in the recess 2c provided on each of the side walls 2a and 2b of the frame 2 in the A or B direction, and the upward movement of the slider 15 is limited by the protrusion 2d. The downward movement of the slider 15 is limited by the contacting portions 15o to 15r which contact the upper ends of the side walls 2a and 2b. Therefore, the slider can move only in the A or B direction.

When the slider 15 moves in the B direction, the contact preventing member 21 rotates counterclockwise since the engaging pin 15m of the slider 15 is received in the hole 21d of the contact preventing member 21. Accordingly, the contact preventing member 21 is rotated about the pin 2f from the contact preventing position to the contact releasing position, shown in FIG. 2, immediately before the holder 5 moves downwardly.

The guiding portion 21a moves to the lowermost position on the frame 2 by sliding on the slopes 24a. Accordingly, the contact portion 21a is not caught between the disk cartridge 4 and the protrusion 24 of the frame 2. That is, the contact preventing member 21 is prevented from being unable to rotate.

Since the protruding pins 5d protruding from the sides of the holder 5 are engaged with the respective slanting grooves 15e provided on the sides 15b and 15c of the slider 15, the protruding pins 5d are moved downwardly along the slanting grooves 15e as the slider 15 moves in the B direction. At the same time, the holder supporting portion 15i of the slider 15 is moved from a position shown in FIG. 9 to a position shown in FIG. 10. Thus, the longitudinal hole 30 provided in the holder 5 moves to the stage 15n of the holder supporting portion 15i and, thus, the height limitation of the holder 5 is released.

Figure 7:
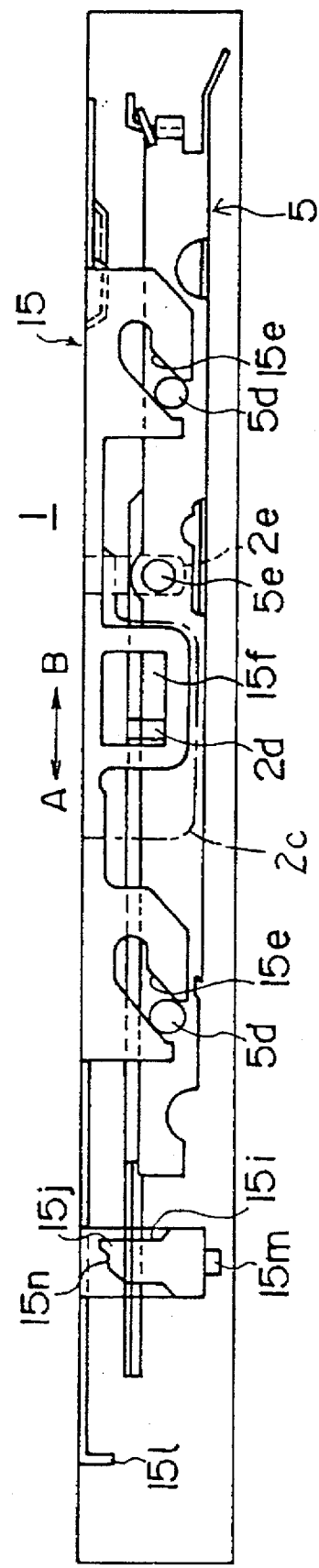
FIG. 7 is a side view of the holder and the slider shown in FIG. 1 when assembled together before a magnetic disk is loaded.

After the height limitation is released, the holder 5 moves downwardly from the eject position shown in FIG. 3 to the disk loaded position shown in FIG. 7 so that the magnetic disk in the disk cartridge 4 is placed on the turntable 25. The arm 11 is rotated by the pressing force generated by the torsion spring as the holder moves downwardly and, thus, the upper magnetic head provided on the arm 11 moves downwardly toward the magnetic disk.

It should be noted that since the shutter 4a of the disk cartridge 4 is opened by the engaging pin 6a of the latch lever 6, the lower and upper magnetic heads 10 and 12 can contact surfaces of the magnetic disk.

Thereafter, the magnetic disk is rotated by rotation of the turntable 25 and the motor 26. In this manner, a magnetic recording/reproducing operation is performed by the lower and the upper magnetic heads 10 and 12.

A description will now be given of an eject operation performed by the magnetic disk apparatus 1.

When the disk cartridge 4 in the magnetic disk apparatus 1 is ejected, the eject button 17 is pressed in the A direction so as to move the slider 15 in the A direction. The holder 5 then moves upwardly to the eject position by following a reverse operation of the above-mentioned insertion operation. The contact preventing member 21 rotates clockwise about the pin 2f (refer to FIG. 5) as the slider 15 moves in the A direction because the fitting hole 21d is engaged with the engaging pin 15m of the slider 15. Accordingly, the guiding portion 21a of the contact preventing member 21 moves to the contact preventing position as the pair of protrusions 21e override the pair of slopes 24a of the protrusion 24 on the frame 2.

When the slider 15 moves in the A direction, the coil spring 7 provided between the latch lever 6 and the slider 15 is stretched and, thus, the spring force of the coil spring 7 is increased. Since the engagement of the engaging portion 15i by the cam portion 6b is released when the spring force of the coil spring 7 is increased, the latch lever 6 strongly rotates to eject the disk cartridge 4.

Figure 10:
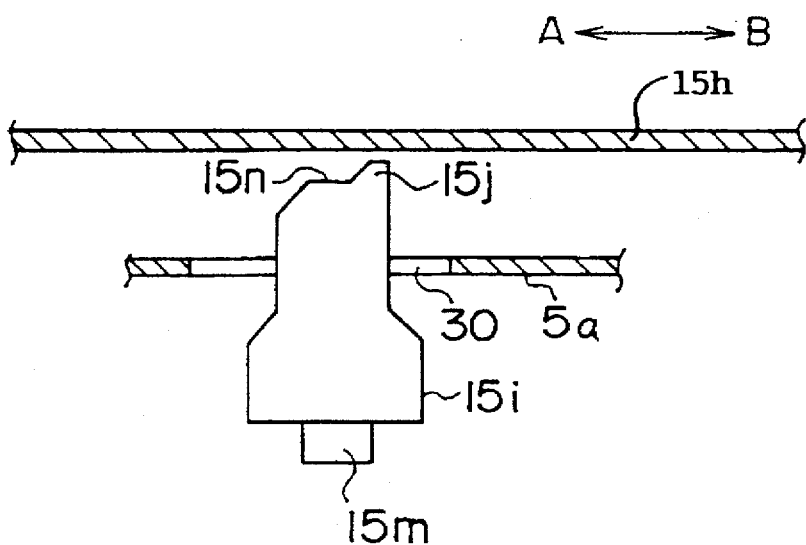
FIG. 10 is a side view of the holder supporting member when the holder is moved downwardly to a disk loaded position.

Since the holder supporting portion 15i of the slider 15 returns from the position shown in FIG. 10 to the position shown in FIG. 9, the stage 15n of the holder supporting portion 15j is moved from the longitudinal hole 30 and is positioned under the top plate 5a of the holder 5. This limits the downward movement of the top plate 5a. Accordingly, after the disk cartridge 4 is ejected from the holder 5, the top plate 5a of the holder 5 is supported by the stage 15n of the holder supporting portion 15j.

It should be noted that although the slider 15 is moved in the B direction by the cooperation of the springs 7 and 19 when the disk cartridge 4 is inserted in the holder 5, the slider 15 may be moved only by the spring 7.

The application of the present invention is not limited to the above-mentioned magnetic disk apparatus, and may be applied to other apparatuses such as an optical disk apparatus or a magneto-optical disk apparatus.

The present invention is not limited to the specifically disclosed embodiments, and variations and modifications may be made without departing from the scope of the present invention.

What is claimed is:

1. A disk apparatus for a disk cartridge, comprising:

a holder movable between a first position and a second position in a direction perpendicular to an insertion direction of said disk cartridge, said disk cartridge being ejected at said first position, and being inserted at said second position;

a slide member holding said holder and movable between a third position and a fourth position in the insertion direction so that said holder is positioned at said second position when said slide member is positioned at said third position and said holder is positioned at said first position when said slide member is positioned at said fourth position;

a frame having side walls extending in the insertion direction, said slide member being slidably supported by upper ends of said side walls, each of said side walls of said frame including an upper edge extending in the insertion direction and said slide member moving along said upper edge, said slide member including contacting portions which contact and slide on said upper edge of each of said side walls, wherein said slide member has a top plate and at least two side plates extended downwardly from the top plate, each side plate having a guiding hole extending in the insertion direction, One of said side plates being formed on one side of said slide member and the other one of said plates being formed on an opposite side of said slide member when viewed in the insertion direction so that said side plates are positioned outside said side walls of said frame when said slide member is assembled with said frame; and an engaging protrusion formed in a recess formed on an outer surface of at least one of said side walls of said frame said recess extending in the insertion direction and said side plate of the slide member slidably received in said recess, said engaging protrusion engaging with said guiding hole so that said slide member is slidable in the insertion direction and restricted by the engaging protrusion from upward movement.

2. The disk apparatus as claimed in claim 1, wherein said slide member is an integrally formed metal plate, and each of said side plates of said slide member is defined by a bent portion of said slide member.

3. The disk apparatus as claimed in claim 1, further comprising a latch lever being rotatably supported on said holder and engaging with said slide member so as to hold said slide member at said fourth position, said latch lever being rotated by a pressing force of said disk cartridge being inserted into said holder to release said slide member; and a spring having a first end engaged with said slide member and a second end engaged with said latch lever, said spring biasing said slide member so that said slide member is moved from said fourth position to said third position when said slide member is released from said latch lever.

4. The disk apparatus as claimed in claim 1, further comprising a holder supporting member provided on said slide member and positioned under said holder so as to prevent a downward movement of said holder when said slide member is positioned at said fourth position; and an opening provided in said holder and aligned with said holder supporting member when said slide member is positioned at said third position so that said holder supporting member extends into said opening.

\* \* \* \* \*